US010003256B2

(12) United States Patent
Gould et al.

(10) Patent No.: US 10,003,256 B2
(45) Date of Patent: Jun. 19, 2018

(54) SYSTEMS AND METHODS FOR CONTROLLING A VOLTAGE MULTIPLIER LADDER FOR OPTIMAL EFFICIENCY AND MINIMAL COMPONENT STRESS

(71) Applicant: Schlumberger Technology Corporation, Sugar Land, TX (US)

(72) Inventors: Darren Gould, Princeton, NJ (US); Jani Petteri Reijonen, Princeton, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 174 days.

(21) Appl. No.: 14/975,632

(22) Filed: Dec. 18, 2015

(65) Prior Publication Data
US 2017/0179818 A1  Jun. 22, 2017

(51) Int. Cl.
*H02M 3/07* (2006.01)
*E21B 47/00* (2012.01)

(52) U.S. Cl.
CPC ............... *H02M 3/07* (2013.01); *E21B 47/00* (2013.01)

(58) Field of Classification Search
CPC .................................. H02M 3/07; E21B 47/00
See application file for complete search history.

(56) References Cited

U.S. PATENT DOCUMENTS

| 3,539,903 | A | 11/1970 | Goebel |
| 3,902,108 | A | 8/1975 | Sion |
| 5,331,255 | A | 7/1994 | Banbury et al. |
| 5,734,256 | A | 3/1998 | Larsen et al. |
| 6,154,382 | A | 11/2000 | Kawahara et al. |
| 7,564,948 | B2* | 7/2009 | Wraight ............... H01J 35/06 378/101 |
| 7,991,111 | B2 | 8/2011 | Wraight et al. |
| 8,203,858 | B2 | 6/2012 | Hanington |
| 8,742,328 | B2 | 6/2014 | Simon et al. |
| 2006/0244645 | A1 | 11/2006 | Ozalevli et al. |
| 2008/0107235 | A1* | 5/2008 | Sundaram ............ H05G 1/10 378/101 |
| 2008/0159480 | A1 | 7/2008 | Wraight et al. |
| 2013/0082790 | A1 | 4/2013 | Trivedi et al. |
| 2013/0208841 | A1* | 8/2013 | Perkins ................ H05H 3/06 376/114 |
| 2014/0270083 | A1 | 9/2014 | Dinsmore |
| 2015/0055747 | A1* | 2/2015 | Simon ............... E21B 47/1015 378/51 |
| 2015/0055748 | A1 | 2/2015 | Simon et al. |

(Continued)

FOREIGN PATENT DOCUMENTS

WO    2013040402 A2    3/2013

OTHER PUBLICATIONS

International Search Report and Written Opinion issued in the Related PCT Application PCT/US2016/066428, dated Aug. 1, 2017 (10 pages).

*Primary Examiner* — Jue Zhang
(74) *Attorney, Agent, or Firm* — Michael Dae

(57) ABSTRACT

A system comprises a voltage multiplier ladder, a driver that provides an input voltage to the voltage multiplier ladder, and a controller that regulates the driver such that a voltage stress in the ladder is evenly distributed and do not exceed a maximum allowable stress and meanwhile the ladder is operating at an optimal efficiency.

9 Claims, 9 Drawing Sheets

(56) References Cited

U.S. PATENT DOCUMENTS

2015/0219720 A1 8/2015 Huh
2015/0231408 A1 8/2015 Williams et al.
2017/0176633 A1 6/2017 Reijonen

* cited by examiner

SYSTEMS AND METHODS FOR CONTROLLING A VOLTAGE MULTIPLIER LADDER FOR OPTIMAL EFFICIENCY AND MINIMAL COMPONENT STRESS

BACKGROUND

This disclosure relates to controlling a frequency of an input voltage to a voltage multiplier ladder to achieve a more optimal operation of the voltage multiplier ladder.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Electronic radiation generators are used in many downhole tools used for well-logging. The electronic radiation generators may use high-voltage sources to cause charged particles to accelerate toward a target. When the charged particles strike the target, radiation such as neutrons or x-rays may be generated. The radiation may exit the downhole tool and penetrate into a geological formation adjacent a wellbore where the downhole tool is located. Measurements of the radiation that returns to the downhole tool may provide an indication of where hydrocarbon resources may be located, as well as other characteristics of the geology of the formation.

Owing to the constraints of a downhole tool, some high-voltage power supplies to the radiation generators may use a modified Cockcroft-Walton voltage multiplier ladder. In one example, the voltage multiplier ladder may be operated at a constant frequency that is expected to be optimal given the components of the voltage multiplier ladder. Yet the properties of the components of the voltage multiplier ladder may vary substantially as the downhole tool is subjected to the various high temperatures and high pressures that may arise in the well. This may cause the voltage multiplier ladder component characteristics to change, leading to a less-than-optimal operation of the voltage multiplier ladder.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, a system is disclosed that comprises a voltage multiplier ladder having a plurality of multiplier stages N including an input stage, an output stage, and an intermediate point stage n between the input and output stage. At least one loading coil is disposed along the voltage multiple ladder. The system further comprises a driver that is configured to provide an input voltage having an input voltage frequency and an input voltage magnitude to the voltage multiplier ladder. The system further comprises a controller that is configured to regulate the driver such that a voltage stress in the ladder is evenly distributed and do not exceed a maximum allowable stress.

In some embodiments, a system is disclosed that comprises a voltage multiplier ladder comprising a plurality of voltage multiplication stages and at least one loading coil. The system further comprises a driver that is configured to provide an input voltage to the voltage multiplier ladder, and a controller that is configured to receive a measured value from an intermediate position along the voltage multiplier ladder and adjust a parameter of the input voltage in accordance with the received measurement.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
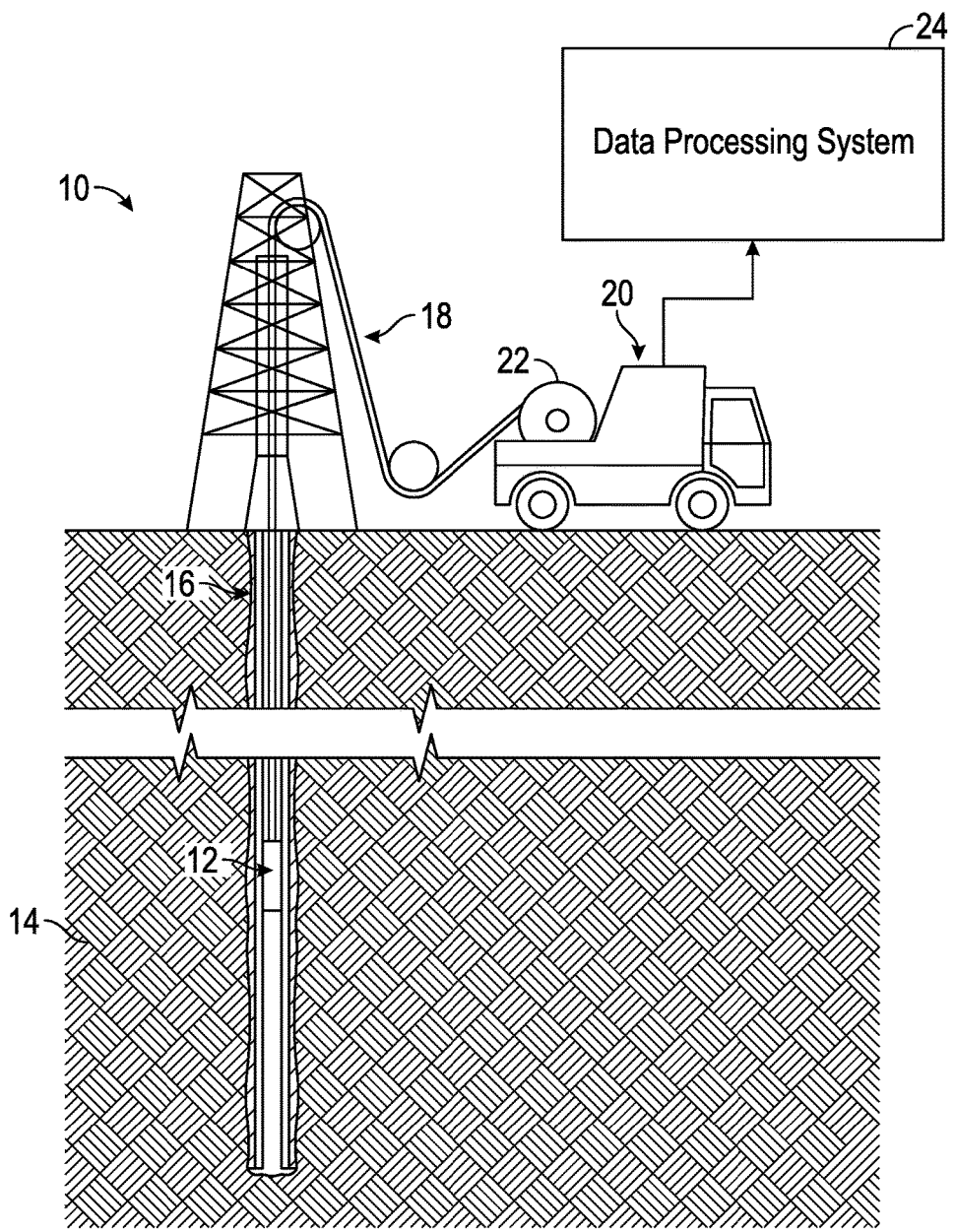
FIG. 1 is a schematic diagram of a well site system that may employ a voltage multiplier ladder controlled according to this disclosure, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A modified Cockcroft-Walton voltage multiplier ladder may be used to supply high voltage (e.g., 60 kv or higher for a typical neutron generator, 200 kV or higher for a typical X-ray generator) to an electronic radiation generator in a downhole tool. The radiation generator may use the high voltage from the voltage multiplier ladder to accelerate charged particles toward a target material. When the charged particles strike the target material, the interaction with the target material may produce radiation such as x-rays or neutrons. The radiation may be used by a downhole tool in a well to assess properties of a well, which may indicate the presence or absence of hydrocarbons at particular locations in the geological formation that surrounds the well. The downhole tool may also use the radiation to identify many other properties of the geological formation, such as porosity, mineralogy, density, and so forth.

The voltage multiplier ladder may be subject to changes in temperature and pressure as the downhole tool is moved through the well. These changes in temperature and pressure may impact the electrical characteristics of the voltage multiplier ladder. For instance, the capacitance, loading coil inductance, and parasitic capacitance of the voltage multiplier ladder may vary. To account for such changes in the electrical characteristics of the voltage multiplier ladder, a controller may determine an input voltage frequency that causes the voltage efficiency not to be held to a particular constant value, but rather to adapt to match a voltage efficiency at one of the internal stages of the voltage multiplier ladder. This adaptive control may allow for improved voltage and frequency efficiency that may produce a correspondingly improved voltage distribution over the voltage multiplier ladder, which may reduce the voltage stress on components of the voltage multiplier ladder. This may increase the operational reliability of the voltage multiplier ladder.

In addition, by measuring the voltage efficiency across an internal stage of the voltage multiplier ladder, a system health parameter that is indicative of system problems may be identified. This system health parameter may allow the voltage multiplier ladder to be indirectly monitored for temperature and voltage stress on components of the voltage multiplier ladder. In addition, the remaining operational time of failure could be predicted from this measurement and used to provide a predictive, proactive maintenance scheduling system. Additionally, the diagnostic health parameter may be used to adjust the operation of the high voltage ladder, e.g. lowering the per stage voltage, in order to prevent a total failure during a job by maintaining a lower but still adequate radiation output of the device.

With this in mind, FIG. 1 illustrates a well-logging system 10 that may employ the systems and methods of this disclosure. The well-logging system 10 may be used to convey a downhole tool 12 that includes such scintillator detectors through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that generates radiation using an electronic radiation generator powered by a voltage multiplier ladder controlled in the manner of this disclosure. The downhole tool 12 may provide radiation measurements (e.g., counts of detected gamma-rays or x-rays) to a data processing system 24 via any suitable telemetry (e.g., via electrical signals pulsed through the geological formation 14 or via mud pulse telemetry). The data processing system 24 may process the radiation measurements to identify certain properties of the wellbore 16 (e.g., porosity, permeability, relative proportions of water and hydrocarbons, and so forth) that may be otherwise indiscernible by a human operator.

By way of example, the data processing system 24 may include a processor, which may execute instructions stored in memory and/or storage. As such, the memory and/or the storage of the data processing system 24 may be any suitable article of manufacture that can store the instructions. The memory and/or the storage may be ROM memory, random-access memory (RAM), flash memory, an optical storage medium, or a hard disk drive, to name a few examples. A display, which may be any suitable electronic display, may provide a visualization, a well log, or other indication of properties of the wellbore 16.

Figure 2:
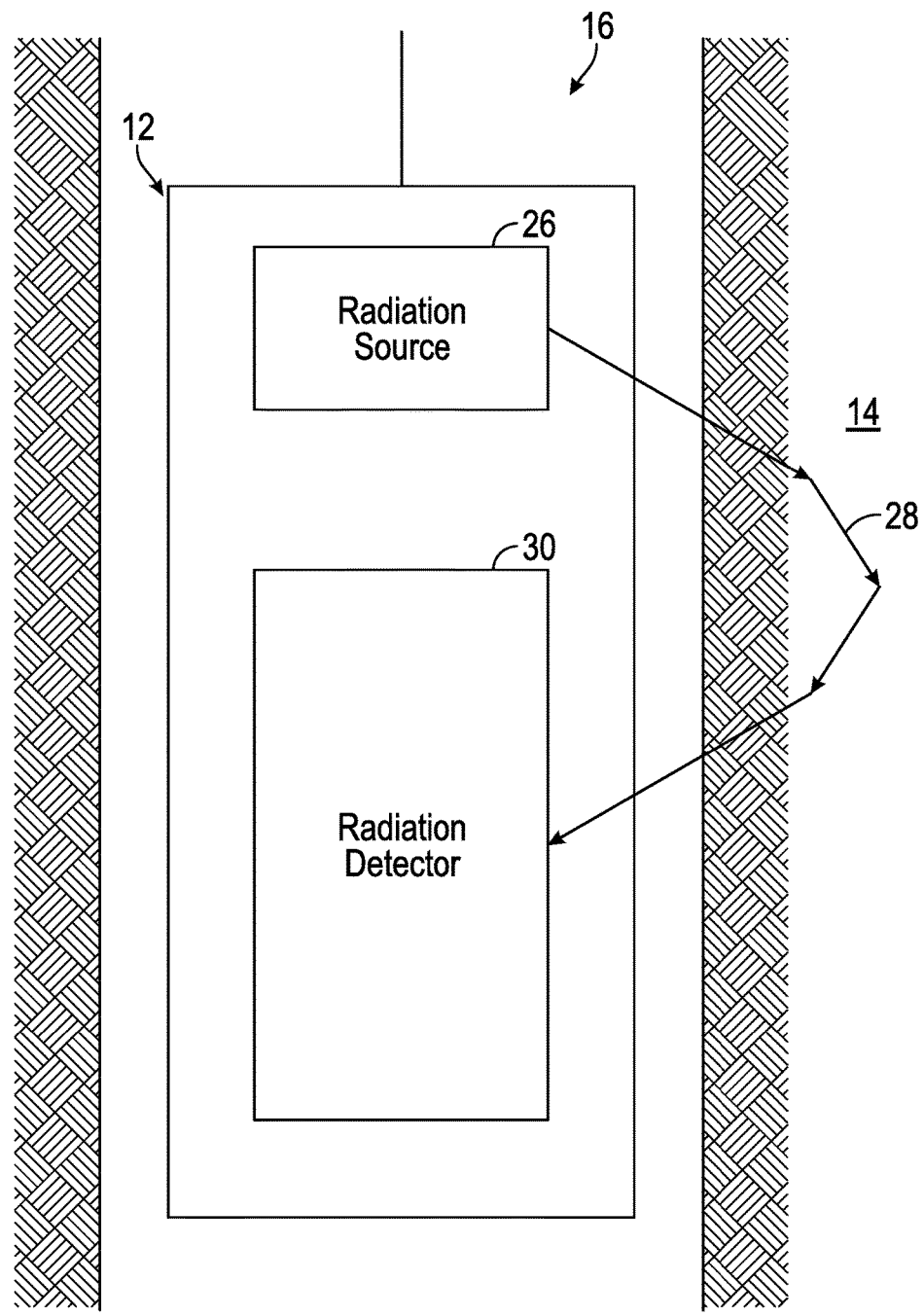
FIG. 2 is a block diagram of a downhole tool that may employ the voltage multiplier ladder of this disclosure, in accordance with an embodiment.

One example of the downhole tool 12 is shown in FIG. 2. The downhole tool 12 may include a radiation source 26 to emit radiation 28 into the geological formation 14. The radiation source includes an electronic radiation generator, such as an electronic x-ray generator or an electronic neutron-generator. The radiation source 26 emits radiation 28 out of the downhole tool 12. For example, the radiation 28 may enter the geological formation 14, where it may scatter or collide with atoms of the geological formation 14 to generate other radiation that also may scatter. Some of the radiation 28 or radiation that results from interactions with the radiation 28 in the geological formation 14 may scatter and return to the downhole tool 12, to be detected by a radiation detector 30. In general, the radiation detector 30 may detect when ionizing radiation enters the downhole tool 12 and generate an electrical signal, such as a count rate of detected radiation or spectrum of detected radiation that may provide an indication of characteristics of the wellbore 16 or the geological formation 14.

Figure 3:
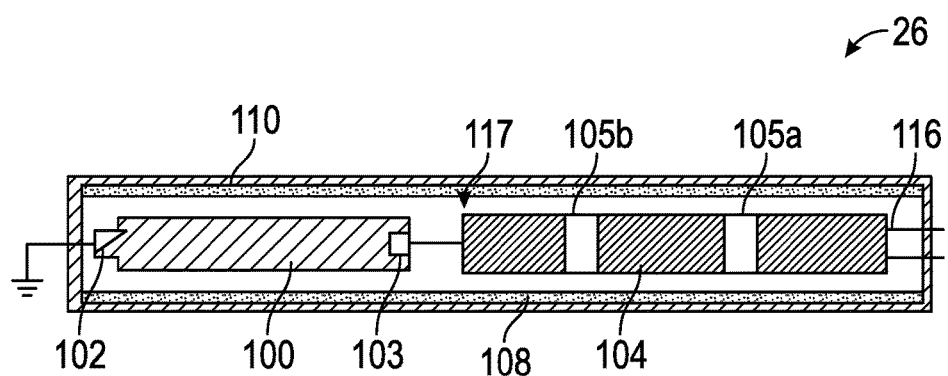
FIG. 3 is a block diagram of a radiation generator that uses the voltage multiplier ladder, in accordance with an embodiment.

One example of the radiation generators shown in FIG. 3. In the illustrated example, the radiation generator is an X-ray generator that includes an X-ray tube 100 that is grounded at a target (i.e., anode) end 102, although floating target configurations may also be used in some embodiments. The X-ray tube 100 further illustratively includes a cathode 103 on the opposite end of the tube from the target end 102. The cathode 103 is coupled to a voltage multiplier ladder 104 that includes mid-stage loading coils 105a, 105b. In some embodiments, the voltage multiplier ladder 104 may take a form as described by U.S. Published Application No. 2015/0055747, "Energy Radiation Generator With Bi-Polar Voltage Ladder," and U.S. Published Application No. 2015/0055748, "Energy Radiation Generator With Uni-Polar Voltage Ladder," which are incorporated by reference in its entirety for all purposes. The voltage multiplier ladder 104 may be coupled to a transformer 106 (shown in FIG. 5). The X-ray tube 100, voltage multiplier ladder 104, and the transformer 106 are enclosed within one or more insulating sleeves 108 (e.g., PFA), which in turn is enclosed within a generator housing 110. An insulating gas may be inserted in an inner space 117 within the generator housing 110. The voltage multiplier ladder 104 further includes an input 116 to receive an AC voltage. The grounded target configuration shown schematically in FIG. 3 provides a simplification in the mechanical design and assembly, which may also help in maintaining mechanical stability of the target, maintaining thermal management of the target, as well as the radiation exposure of the insulating material 108.

Figure 4:
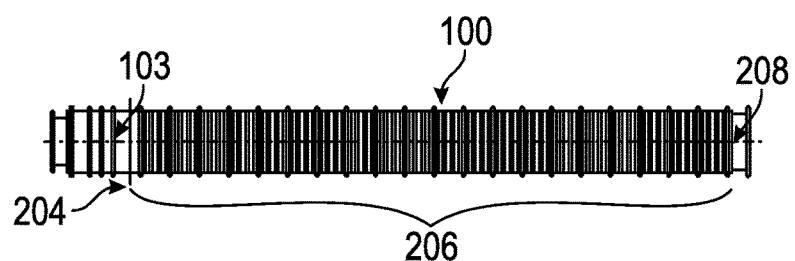
FIG. 4 is an example of a radiation tube that receives high voltage signals from the voltage multiplier ladder, in accordance with an embodiment.

The cathode 103 releases electrons in response to exposure to heat, although in some embodiments "cold" cathodes (e.g., Carbon nanotubes, etc.) may also be used. As shown in FIG. 4, the voltage multiplier ladder 104 applies a voltage to the cathode 103, and the introduction of current heats the cathode 103 and causes it to release electrons. A grid 204 is optionally provided to move electrons released from the cathode 103 toward an electron-accelerating section 206. The accelerating section 206 speeds electrons toward a target 208. Upon collision with the target 208, X-rays are generated which may be used in various applications, such as downhole well-logging measurements.

A basic unipolar voltage multiplier ladder configuration may be inadequate for achieving very high voltages if the required voltage is on the order of hundreds of KV) within the space confines dictated for downhole use. That is, given the space constraints of the downhole tool pad or sonde housing in which a voltage multiplier ladder is deployed, it may be difficult to achieve desired voltage levels with the basic unipolar configuration. More particularly, this is due to voltage efficiency, which may be defined as the ratio of the output voltage and the input voltage multiplied by the number of stages. For example, a 30- or 40-stage basic unipolar voltage multiplier ladder may have a voltage efficiency of about 40% to 60%. For an input voltage of 15 kV, which is roughly the maximum voltage rating for most components currently available commercially (e.g., capacitors and diodes) at sizes appropriate for downhole tools, the output voltage may be plotted against the number of stages. Cascading stages reduces the voltage efficiency. The output voltage converges to a given value, which is around 250 kV. Adding a relatively large number of stages may therefore not provide desired high operating voltages. The inability of such configurations to generate high voltages may further be attributed to the stray capacitance across the stages.

To generate higher voltages (e.g., of 400 kV or more) using a unipolar ladder, one or more loading coils may be positioned at appropriate intermediate locations or positions in the voltage multiplier ladder. In a particular embodiment illustrated in FIG. 5, the first and second coils 105a, 105b may be positioned approximately two-fifths and four-fifths stage positions, respectively, down the length of the voltage multiplier ladder 104. The number of loading coils and the position of the loading coils may vary depending on the application. The first coil 105a and the second coil 105b may be substantially identical to one another, respectively positioned at about $\frac{2}{5}^{th}$ and $\frac{4}{5}^{th}$ along the length of the voltage multiplier ladder 104. In this configuration an optimal voltage efficiency $F_{opt}$ may be derived using the C, $C_s$ and N by using the square root of the ratio of the $C_s$ and C multiplied by the N, such as:

$$F_{opt} = \frac{\tanh\left(2N\sqrt{\frac{C_S}{C}}\right)}{2N\sqrt{\frac{C_S}{C}}}, \quad (1)$$

where C is the voltage multiplier ladder series capacitor, $C_s$ is the stray capacitance, and N is the number of voltage multiplication stages of the voltage multiplier ladder 104. If the optimal voltage efficiency were treated as a constant value, the optimal frequency $f_{opt}$ of the voltage multiplier ladder may be given by the equation:

$$f_{opt} = \frac{1}{2\pi}\sqrt{\frac{1}{L\sqrt{CC_S}} \cdot \frac{1}{\tanh\left(\frac{2}{5}N\sqrt{\frac{C_S}{C}}\right)}}, \quad (2)$$

where C is the voltage multiplier ladder series capacitor, $C_s$ is the parasitic capacitance between the AC and DC leg of the voltage multiplier ladder, and N is the number of voltage multiplication stages of the voltage multiplier ladder 104.

Figure 5:
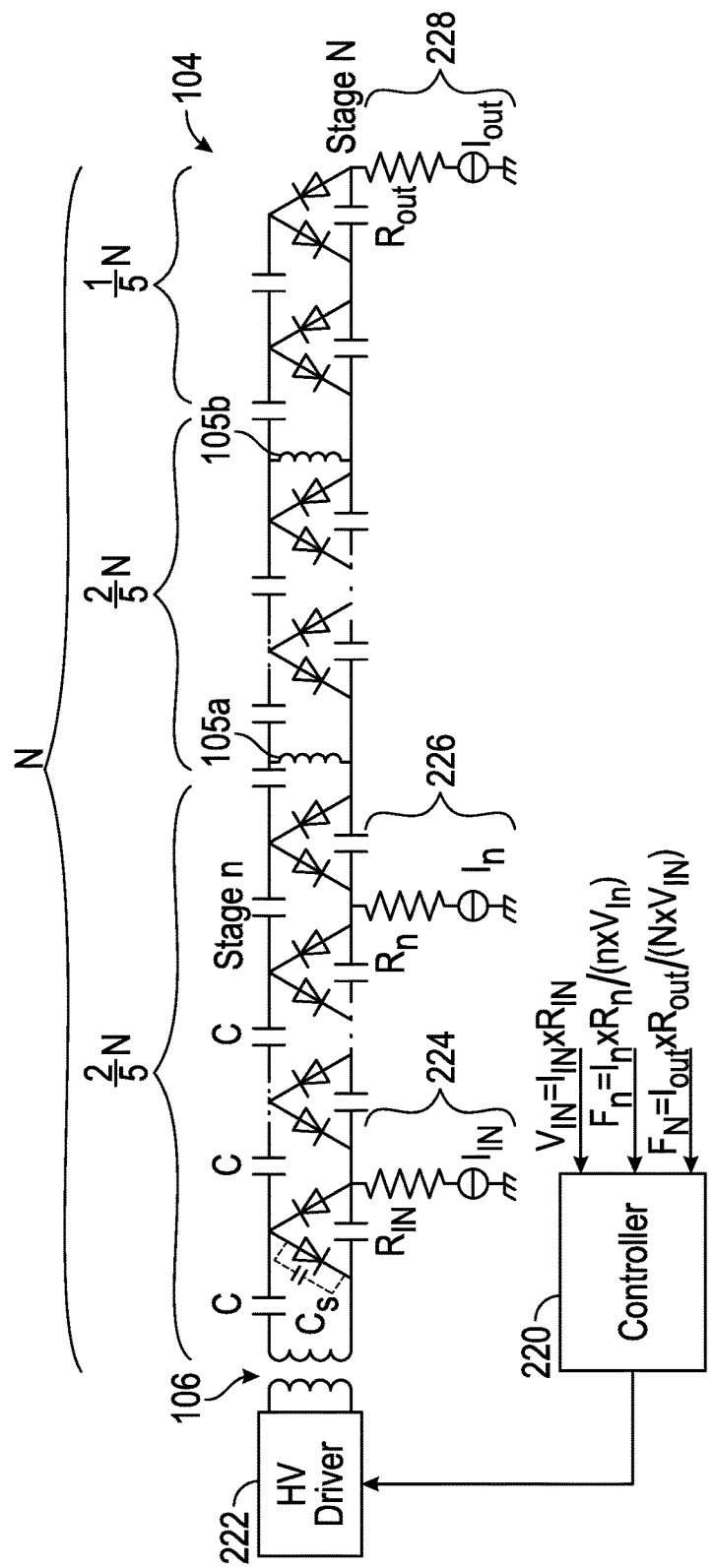
FIG. 5 is a block diagram of a controller and the voltage multiplier ladder for regulating the voltage multiplier ladder, in accordance with an embodiment.

It should be noted that in the example illustrated in FIG. 5, the capacitor of each stage is depicted as being the same for the entire length of the voltage multiplier ladder. However, this example is provided for the simplicity of illustration only. Variations to this design are possible. For example, different capacitors and/or diodes with different ratings can be used in different stages of the voltage multiplier ladder. A "tapered" configuration is also possible, such as having higher rated capacitors and/or diodes at the beginning of the voltage multiplier ladder and lower rated capacitors and/or diodes towards the end of the voltage multiplier ladder. The tapering can be gradual (from stage to stage), or stepped (from a group of stages to a next group of stages), or a combination thereof. All such variations can be modeled and/or mathematically calculated based on variations to the equations disclosed herein.

As noted above, however, the electrical characteristics of the voltage multiplier ladder 104 may vary as the downhole tool 12 moves through the wellbore 16. To achieve optimal performance, the voltage multiplier ladder 104 shown in FIG. 5 is regulated by a controller 220 that adjusts the operating frequency and a magnitude of an input voltage supplied by a high-voltage driver 222 into the voltage multiplier ladder 104 via the transformer 106. The controller 220 may include, for example, an application-specific integrated circuit (ASIC); a programmable logic device, such as a field-programmable gate array (FPGA); a processor and memory storing instructions to carrying out a method of this disclosure; some combination of these; or the like.

Figure 6:
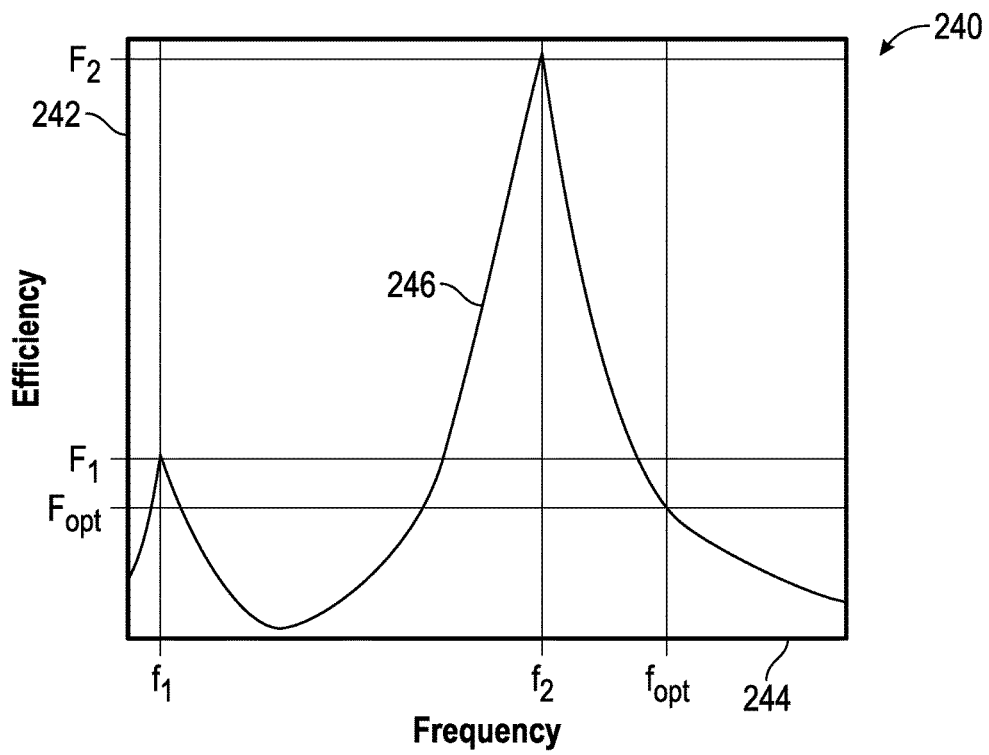
FIG. 6 is a plot of voltage efficiency in relation to frequency of the voltage multiplier ladder that would occur if the electrical components of the voltage multiplier ladder were not affected by the downhole environment, in accordance with an embodiment.

Before discussing the operation of the controller 220 shown in FIG. 5, certain characteristics of the operation of the voltage multiplier ladder 104 will first be described. Turning to FIG. 6, for example, a plot 240 illustrates a relationship between voltage efficiency F (ordinate 242) and input voltage frequency f (244). A resonant curve 246 includes two resonant peaks of a first peak value F1 occurring at a frequency f1 and a second peak value F2 occurring at a frequency f2, due to the two loading coils 105a and 105b. To avoid overstressing the components of the voltage multiplier ladder, it is advisable to avoid driving the ladder at a resonating frequency. Stated in another way, the voltage multiplier ladder 104 may be driven at an optimal frequency $f_{opt}$ and optimal voltage efficiency $F_{opt}$, out of resonance of the voltage multiplier ladder. For example, in the illustrated embodiment in FIG. 6, the optimal frequency $f_{opt}$ is chosen at a frequency above the second resonant peak occurring at the frequency f2. In this embodiment, the optimal voltage efficiency is about 90% and it occurs at the optimal frequency $f_{opt}$. Other input frequency and voltage efficiency can also be chosen depending on the specific condition an operator would consider as optimal.

Figure 7:
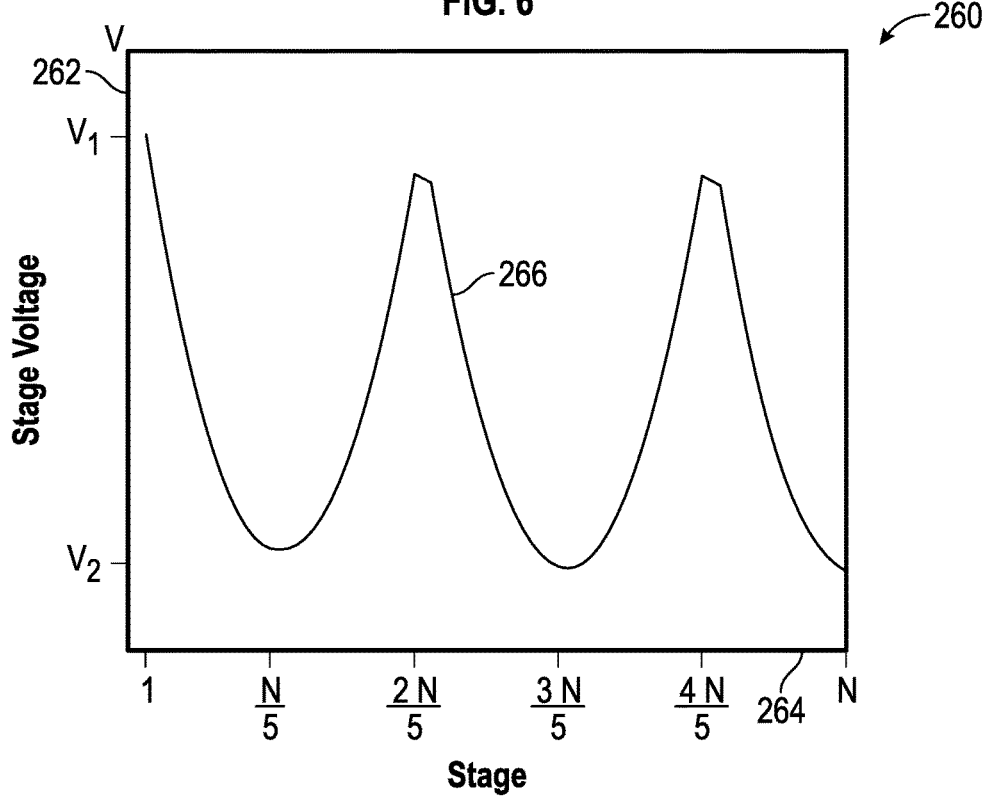
FIG. 7 is a plot of the voltage at various stages of the voltage multiplier ladder that would occur if the electrical components of the voltage multiplier ladder were not affected by the downhole environment, in accordance with an embodiment.

FIG. 7 is a plot 260 of voltage V across the ladder capacitor C (ordinate 262) over the stages (abscissa 264) of the voltage multiplier ladder 104 when driven at the optimal frequency $f_{opt}$ and the optimal voltage efficiency $F_{opt}$. $V_1$ represents the maximum voltage and $V_2$ represents the minimum voltage across a capacitor C in the ladder. When the voltage multiplier ladder 104 of FIG. 5 is driven at the optimal frequency and voltage efficiency, the voltage across each element of the voltage multiplier ladder at each stage is well defined and optimal as shown by a curve 266. This optimal voltage distribution ensures that the voltage across each capacitor C is well defined, fluctuating between a minimum voltage $V_1$ and a maximum voltage $V_2$. The maximum voltage $V_2$ is kept at or below the input voltage $V_{in}$ applied to the first stage of the voltage multiplier ladder 104. This way, an operator can easily control the stress level at each stage to ensure the voltage does not exceed the voltage ratings of the voltage multiplier ladder capacitors C and loading coils 105a, 105b. This is particularly valuable for systems in restricted spaces, such as radiation generators used in downhole logging tools, which, owing to size limitations, are restricted in space and the voltage margin may be relatively small in relation to the input voltage $V_{in}$.

The example shown in FIGS. 6 and 7 is based on an assumption of a constant optimal voltage efficiency can be relied upon during an entire operation. In reality, however, the assumed optimal voltage efficiency, as shown in the equations above, may actually change with variations in the voltage multiplier ladder capacitance C, the inductance L of the loading coils 105a, 105b and the parasitic capacitance $C_s$. These components, in particular the voltage multiplier ladder capacitances and parasitic capacitances, may vary with temperature and applied voltage. As such, when a system such as a downhole tool 12 is in the wellbore 16, the optimal voltage efficiency may, in fact, be constantly changing. The amount of variation in the components depends on the components and insulating materials that are used, but these variations can be quite substantial. Capacitance variations of 30% over the operating temperature range and variations of up to 50% over the applied voltage may be seen. Variations in the parasitic capacitance, too, may affect the optimal voltage efficiency if potting material or other insulating materials are used that have a strong temperature dependency. Other variations, such as diode current leakage and parasitic resistance changes, may also have indirect impacts on the voltage efficiency.

Figure 8:
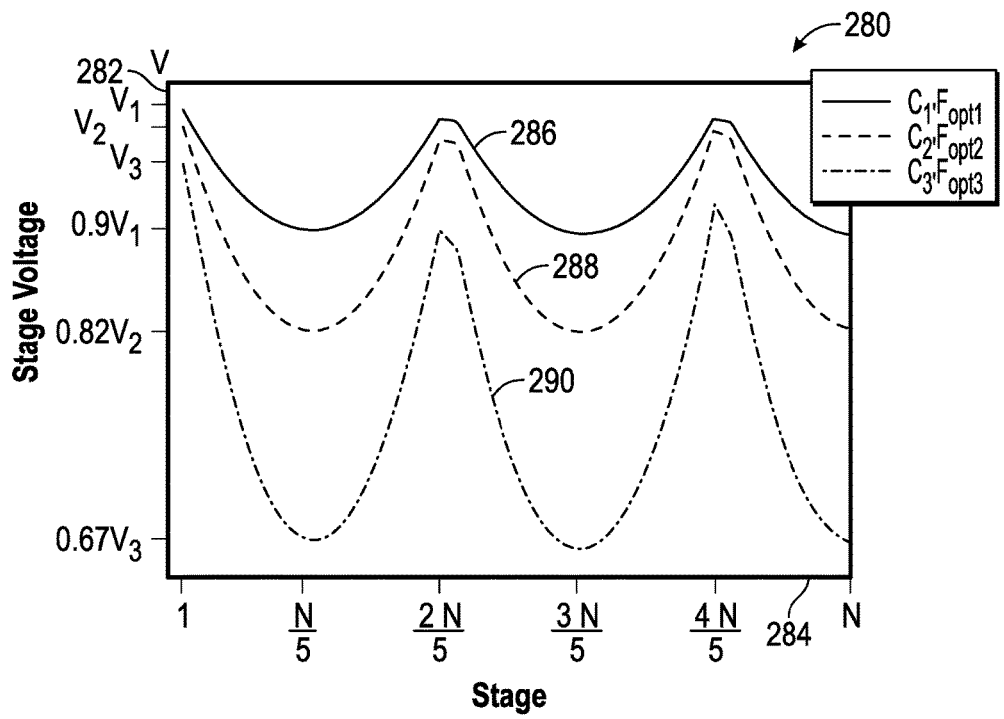
FIG. 8 is a plot of the voltage at various stages of the voltage multiplier ladder for various capacitances that may occur in a downhole environment, in accordance with an embodiment.

Some of these changes are shown by a plot 280 of FIG. 8, which shows simulation results of voltage (ordinate 282) per stage (abscissa 284) for an optimal frequency regulation of an N-stage voltage multiplier ladder 104 with varying capacitances. In particular, the plot 280 shows the effect of a parasitic capacitance $C_1$ at 100% (curve 286), $C_2$ at 55% (curve 288), and $C_3$ at 27% (curve 290) when the voltage multiplier ladder 104 is driven at a different optimal frequency $f_{opt}$ that corresponds to a different optimal voltage efficiency $F_{opt}$. As the capacitance of the voltage multiplier ladder 104 decreases, the voltage sag between stages also decreases. At $C_1$, the voltage sags to approximately 90% of the maximum voltage, at $C_2$ the voltage sags to approximately 82% and at $C_3$ the voltage sags down to 67%. The optimal frequency $f_{opt}$ increases throughout this capacitance decrease also increases by about 10%. The optimal voltage efficiency due to the capacitance drop ensures that $F_{opt1} > F_{opt2} > F_{opt3}$. Similar effect can be seen if other variables, such as ladder capacitance, diode leak current, etc. are changed.

Figure 9:
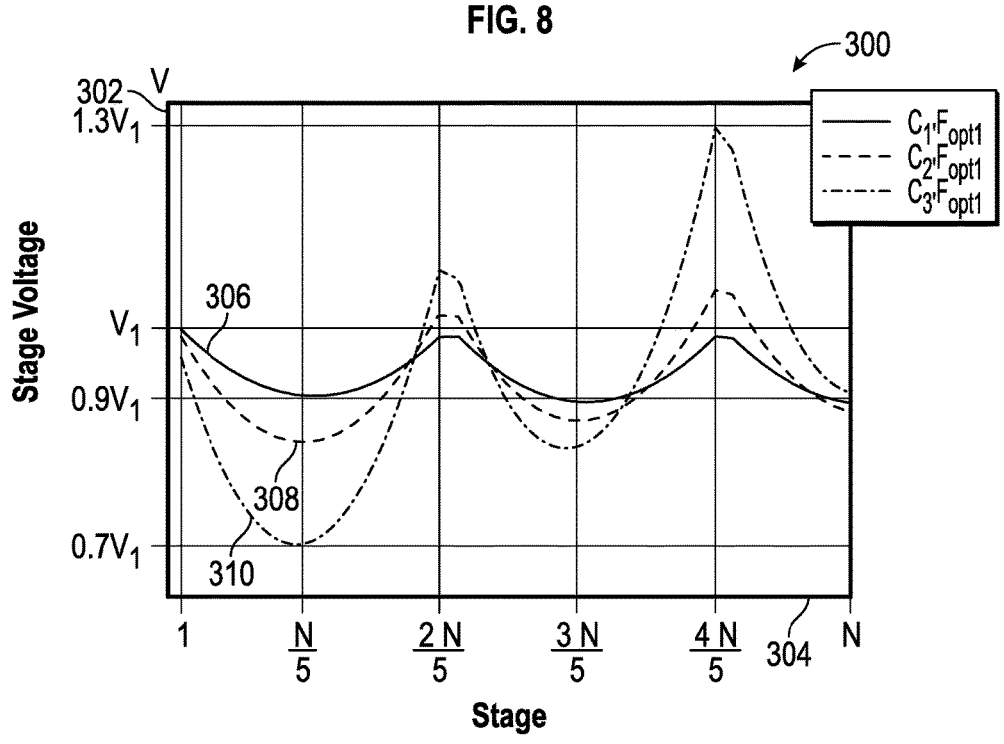
FIG. 9 is another plot of stage voltages at various stages of the voltage multiplier ladder for various capacitances that may occur in a downhole environment, in accordance with an embodiment.

Ignoring these variations in operation by driving the voltage multiplier ladder 104 based on a fixed optimal frequency $f_{opt}$ with a fixed optimal voltage efficiency $F_{opt}$ may produce an uneven voltage distribution across the voltage multiplier ladder 104, overstressing certain stage or stages of the ladder which may eventually lead to malfunctioning or breakdown of the ladder. An example is illustrated in FIG. 9, where a plot 300 is depicted to plot voltage V (ordinate 302) over stage N (abscissa 304) of a voltage multiplier ladder 104. The plot 300 shows the effect of differences in parasitic capacitance—$C_1$ at 100% (curve 306), $C_2$ at 55% (curve 308), and $C_3$ at 27% (curve 310)—when the voltage multiplier ladder 104 is driven to an optimal frequency $f_{opt}$ that assumes a constant optimal voltage efficiency $F_{opt1}$. In these three cases of ladder capacitance $C_1$, $C_2$ and $C_3$, the output voltage is equal but the voltage distribution across the capacitors C of the voltage multiplier ladder 104 is sub-optimal. The larger sagging stage voltage in $C_2$ and $C_3$ indicate a downward shift in the voltage efficiency $F_{opt}$ which would not be optimal if the optimal frequency $f_{opt}$ were assumed to be constant. Under such conditions, the resulting regulation would cause the voltage per stage at higher stages to increase above the input voltage, reaching, in this simulation example, 30% above the initial voltage at stage 4 N/5 for ladder capacitance $C_3$. This suboptimal voltage distribution leads to overstress on the voltage multiplier ladder 104 capacitors, which will decrease the reliability of the voltage multiplier ladder 104 by appreciable amounts.

With reference once again to FIG. 5, the controller 220 may avoid such a suboptimal voltage distribution by regulating the optimal voltage efficiency $F_{opt}$ in a control loop. In particular, test circuitry 224, 226, and 228 may measure the voltage at certain stages of the voltage multiplier ladder 104. For example, a test circuitry 224 may measure the voltage at the input stage of the voltage multiplier ladder 104. One or more test circuitry 226 may measure the voltage at one or more stage n of the voltage multiplier ladder 104. Further, a test circuitry 228 may measure the voltage at the output stage of the voltage multiplier ladder 104. Although the test circuitry 226 is shown once in the example of FIG. 5, other examples may include many instances of the test circuitry 226 at various stages n throughout the total N stages of the voltage multiplier ladder 104 between the input stage and the output stage of the voltage multiplier ladder 104. The stage n that is selected for testing may be any suitable interim stage that is used to regulate the optimal voltage efficiency $F_{opt}$ in the control loop. In some embodiments, the test circuitry 226 is located at a stage n that is adjacent to a loading coil 105a or 105b. In some embodiments, the test circuitry 226 is electrically coupled to a loading coil 105a or 105b.

In an example illustrated in FIG. 5, the test circuitry 224, 226, and 228 may use a bleed resistor (R) and a current (I) sensor to obtain voltage (e.g., V=IR), though any other suitable circuitry may be used. The efficiency at any stage n or stages in the voltage multiplier ladder 104 may be measured with the respective bleed resistor $R_n$ and an appropriate measurement circuit for current sensing to determine the bleed current $I_n$, along with the first stage voltage $V_{in}$, using the equation below:

$$F_n = \frac{I_n R_n}{n V_{in}}. \quad (3)$$

For example, the controller 220 may receive three inputs: measurements that enable determination of a voltage input signal $V_{in}$, an output voltage efficiency $F_N$ representing the voltage efficiency at the output stage of the voltage multiplier ladder 104, and an intermediate stage voltage efficiency $F_n$ representing the voltage efficiency at a stage n of the voltage multiplier ladder 104. Using measurements from the test circuitry 224, the voltage input signal $V_{in}$ may be identified according to the following relationship:

$$V_N = I_{IN} \times R_{IN} \quad (4),$$

where $R_{IN}$ represents a resistance of the bleed resistor of the test circuitry 224 and $I_{IN}$ represents a current measured at the test circuitry 224.

Using measurements from the test circuitry 224 and 228, the output voltage efficiency $F_N$ may be identified according to the following relationship:

$$F_N = I_{OUT} \times R_{OUT}/(N \times V_{IN}) \quad (5),$$

where $R_{OUT}$ is the resistance of the bleed resistor of the test circuitry 228 and the $I_{OUT}$ is the current measured by the test circuitry 228, N is the number of the last stage of the voltage multiplier ladder 104, and $V_{IN}$ is the input voltage measured at the test circuitry 224 according to Equation 4.

Using measurements from the test circuitry 224 and 226, the intermediate stage voltage efficiency $F_n$ may be identified according to the following relationship:

$$F_n = I_n \times R_n/(n \times V_{IN}) \quad (6),$$

where $R_n$ is the resistance of the bleed resistor of the test circuitry 226, $I_n$ is the current measured by the test circuitry 226, n is the number of the stage of the voltage multiplier ladder 104 where the test circuitry 226 is located, and $V_{in}$ is the input voltage measured at the test circuitry 224 according to Equation 4. It should be appreciated that the values from Equations 4, 5, and 6 may be calculated by the controller 220 or may be provided as inputs (e.g., via some prior calculation circuitry that provides the outputs of Equations 4, 5, and 6 as inputs into the controller 220).

Moreover, it should be appreciated that in the example illustrated herein, the capacitor and diode of each stage are assumed to be the same for each stage of the voltage multiplier ladder. However, this example is provided for the simplicity of illustration only. Variations to this design are possible. For example, as discussed above, different capacitors and/or diodes with different ratings and properties can be used in different stages of the voltage multiplier ladder. A "tapered" configuration is also possible, such as having higher rated capacitors and/or diodes at the beginning of the voltage multiplier ladder and lower rated capacitors and/or diodes towards the end of the voltage multiplier ladder. The tapering can be gradual (from stage to stage), or stepped (from a group of stages to a next group of stages), or a combination thereof. All such variations can be modeled or mathematically calculated based on variations to the equations disclosed herein.

The control loop of the controller 220 thus can be used to regulate the driver 222 to ensure an optimal efficiency with minimal component stress across the voltage multiplier ladder 104 ladder. In one particular embodiment, the voltage efficiency at a given intermediate stage n is compared with the voltage efficiency $F_N$ at the last stage N such that $F_n$ has a pre-determined functional relationship with $F_N$. If $F_n$ deviate from $F_N$ significantly, an instructional signal can be generated by the controller 220 and delivered to the HV driver 222 so that a different voltage frequency (and/or a magnitude of input voltage) can be adopted to bring $F_n$ back to the pre-determined functional relationship with $F_N$. This allows for dynamic control over the voltage multiplier ladder 104 despite changes to the optimal due to variations in components, parasitic characteristics, and environmental conditions such as temperature. Besides the optimal frequency, the controller 220 may also regulate the desired output voltage, the input voltage to the driver 222, and/or the parameters of transformer 106, etc.

Figure 10:
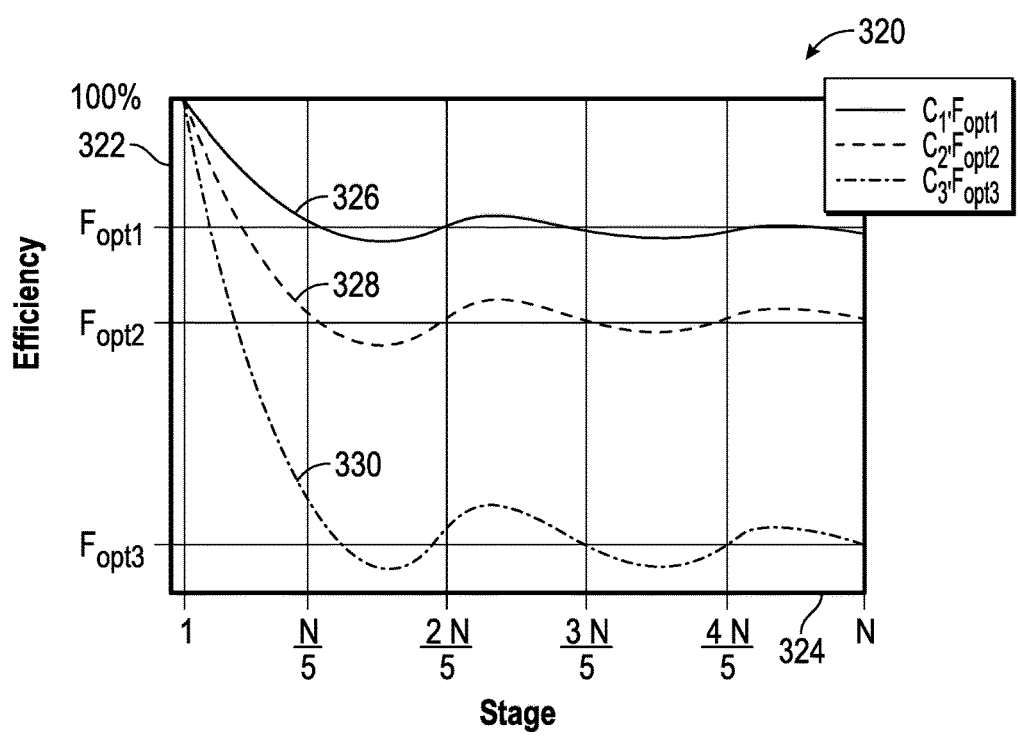
FIG. 10 is a plot of voltage efficiency across the stages of the voltage multiplier ladder when controlled such that the output stage voltage efficiency is equal to an intermediate stage voltage efficiency, in accordance with an embodiment.

This exemplary embodiment is further illustrated in FIG. 10. Plot 320 depicts simulation results of voltage (ordinate 322) over stage (abscissa 324) where the efficiency is calculated at each stage n in the voltage multiplier ladder 104 from 1 to N when the voltage multiplier ladder 104 is operating at the optimal frequency $f_{opt1}$ (curve 326), $f_{opt2}$ (curve 328), or $f_{opt3}$ (curve 330) for the corresponding capacitance $C_1$, $C_2$ and $C_3$ of the voltage multiplier ladder 104. When stage n is greater than N/5, the measured efficiency $F_n \approx F_N$ for stages n thereafter with a very low standard deviation in the data. In fact, as the frequency varies away from the optimal value, the measured efficiencies trend higher or lower. The regulation controller 220 thus may vary the drive frequency f to obtain $F_n$ to be substantially the same as $F_N$. The frequency at this point is $f_{opt}$ and the efficiency is $F_{opt}$. The input drive voltage V may be increased or decreased until the desired output voltage is obtained.

Figure 11:
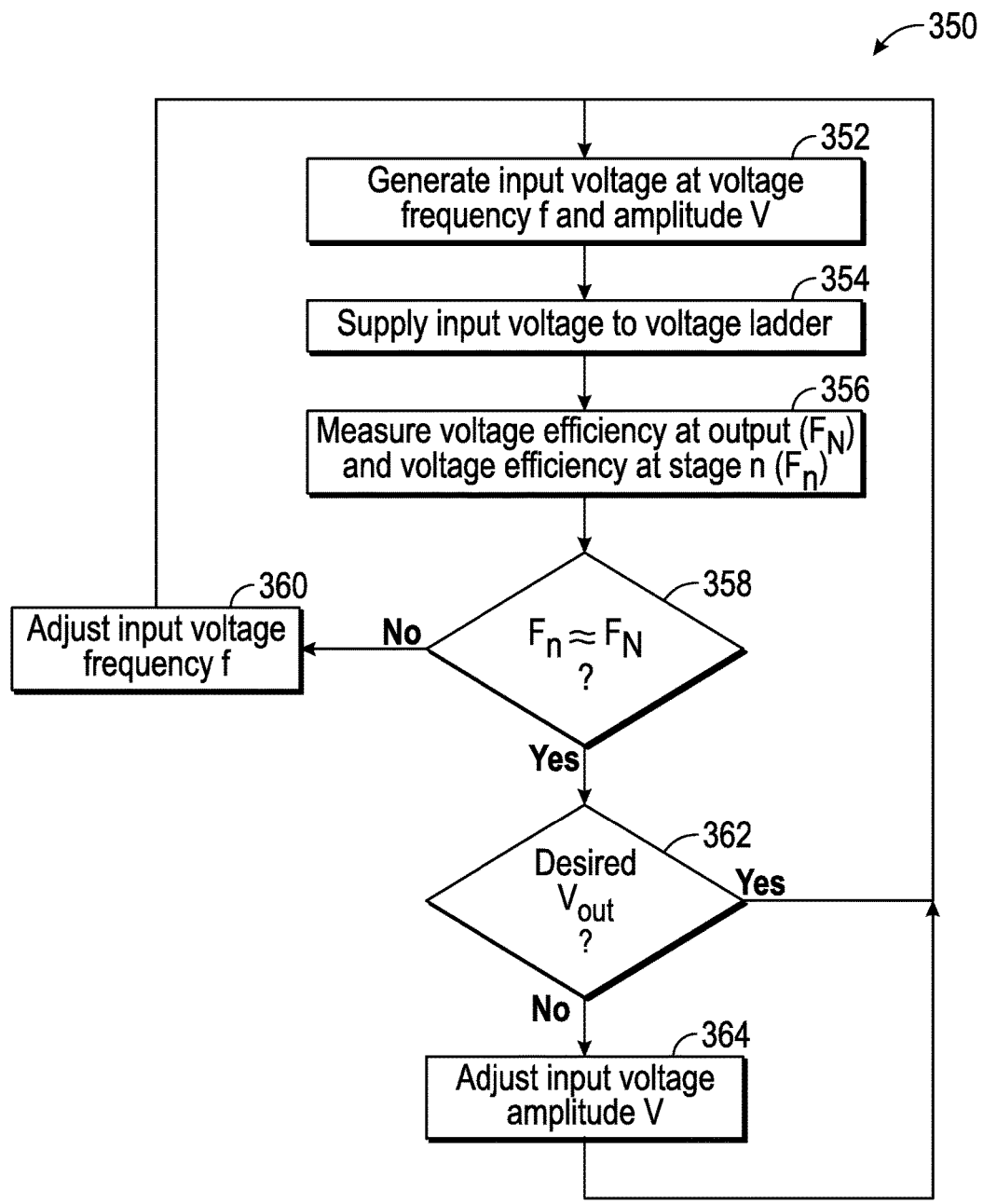
FIG. 11 is a flowchart of a method for controlling the voltage multiplier ladder, in accordance with an embodiment.

This exemplary embodiment can be further illustrated by a flowchart 350 of FIG. 11, the controller 220 may generate an input voltage at an input frequency f and a voltage magnitude V (block 352). The voltage multiplier ladder 104 may be driven at the input voltage (block 354). One or more of the test circuitry 224, 226, and 228 may obtain measurements that allow certain values of voltage efficiency such as $F_n$ and $F_N$ to be identified as discussed above (block 356).

If the values of voltage efficiency $F_n$ and $F_N$ are substantially equal (decision block 358), the controller 220 may adjust the input voltage frequency according to any suitable method (block 360) and blocks 352, 354, 356, and 358 may repeat on occasion, periodically, or continuously. For example, the controller 220 at block 360 may increase or decrease the input frequency and observe whether the voltages efficiencies $F_n$ and $F_N$ get closer or farther apart from one another, and aim to minimize a difference between the voltage efficiencies $F_n$ and $F_N$.

When the values of voltage efficiency $F_n$ and $F_N$ are substantially equal (decision block 358), this may suggest that the optimal frequency $f_{opt}$ and optimal voltage efficiency $F_{opt}$ given the current conditions of the voltage multiplier ladder 104 have been achieved. Accordingly, the controller 220 may select the magnitude of the input voltage V to achieve a desired output voltage $V_{out}$. If the output voltage $V_{out}$ is the desired value (decision block 362), the controller 220 may not change the magnitude of the input voltage V and blocks 352, 354, 356, 358, and 362 may repeat on occasion, periodically, or continuously, until a change occurs that causes the values of voltage efficiency $F_n$ and $F_N$ not to be substantially equal (decision block 358) or the desired output voltage Vons not to be achieved (block 362). For example, if the output voltage $V_{out}$ is not at the desired value (decision block 362), the controller 220 may adjust the magnitude of the input voltage V (block 364) until the desired output voltage $V_{out}$ is reached.

It should be appreciated that the above example is provided for illustration purpose only. Variations to the illustrated embodiments can be devised without departing from the inventions disclosed herein. For example, instead of providing the test circuitry 228 at the last stage N of the voltage multiplier ladder 104, one may connect the test circuitry 228 at the second to the last stage, i.e. stage N−1, of the voltage multiplier ladder 104, or stage N−2 of the voltage multiplier ladder 104, and so on. In such an event, the operation in block 358 may be no longer whether $F_n$ is substantially the same as $F_N$, but rather whether $F_n$ is substantially within a functional relationship with $F_{N-1}$ or $F_{N-2}$, and so on. One example of such functional relationship is shown in plot 320 of FIG. 10. Other functional relationship may also be used depending on the specific condition and designs of a particular ladder.

Similarly, one may appreciate that the measurement at the end of the voltage multiplier ladder 104 may be completely omitted if a functional relationship between the voltage frequency and the stage can be predetermined either experimentally or by simulation, such as the plot 320 in FIG. 10. In such an event, the measurement taken at an intermediate stage n can be compared to a pre-determined value. If there is a substantial deviation from the pre-determined value, the controller 220 may adjust one or more parameters of the HV driver, such as a voltage frequency, an amplitude of the input voltage, or a combination thereof. Therefore, the performance of the voltage multiplier ladder 104 can be dynamically regulated so that it may operate at an optimal efficiency with minimal possibility to overstress the components of the voltage multiplier ladder 104.

Sometimes the voltage multiplier ladder 104 is folded to reduce length. The turning point of the voltage multiplier ladder 104 may be used as tap point for measurement. A few exemplary embodiments in this respect can be found in co-pending, co-assigned, and concurrently filed patent application titled "Collocation of Radiation Generator Components for Limited-Space Devices", by Jani Reijonen, the entire content of which is incorporated herein by reference.

Figure 12:
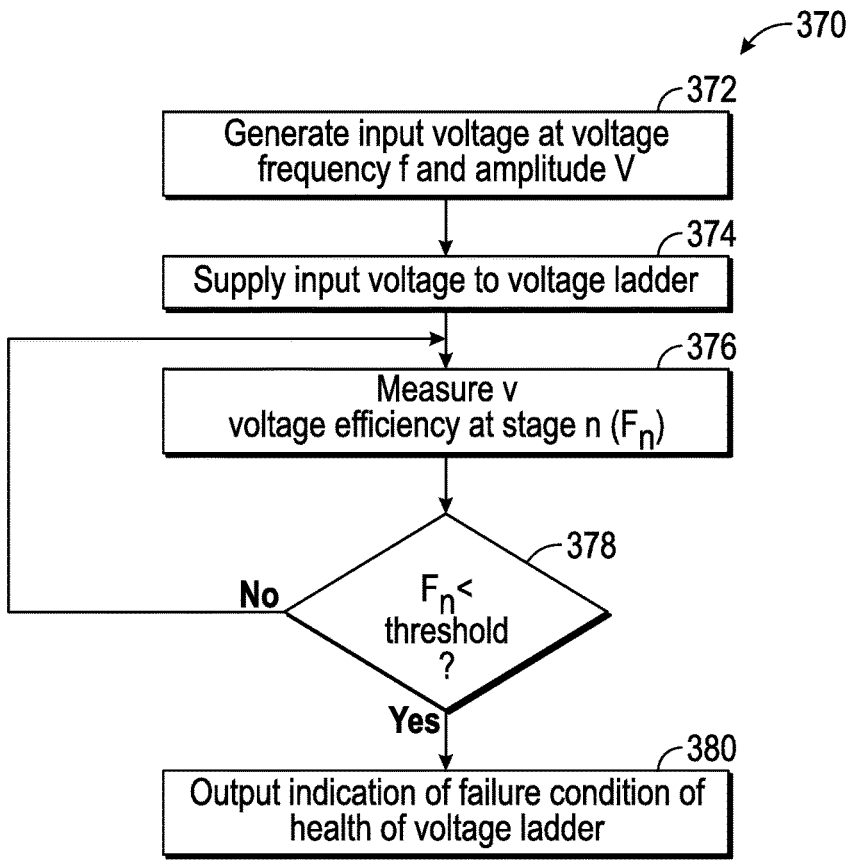
FIG. 12 is a flowchart of a method for identifying a failure condition of the health of the voltage multiplier ladder, in accordance with an embodiment.

The measurements used to regulate the voltage multiplier ladder 104 (e.g., in accordance with the flowchart 350 of FIG. 11) may also be used to ascertain a relative health status of the voltage multiplier ladder 104. For instance, as shown by a flowchart 370 of FIG. 12, the controller 220 may generate an input voltage at an input frequency f and a voltage magnitude V (block 372). The voltage multiplier ladder 104 may be driven at the input voltage (block 374). The test circuitry 224, 226, and 228 may obtain measurements that allow the values such as the voltage efficiency $F_n$ to be substantially the same as discussed above (block 376). If the voltage efficiency $F_n$ is identified as less than some threshold value (decision block 378), this may indicate a possible impending failure condition of the voltage multiplier ladder 104. As such, the controller 220 may provide an indication message to the data processing system 24 at the surface or elsewhere within the downhole tool 12 (block 380). The threshold may be any suitable value based on experimental or simulated failure conditions of the voltage multiplier ladder 104. The indication message output based on the identification below-threshold voltage efficiency $F_n$ may indicate and, thus, may allow human operators to proactively identify, when the voltage multiplier ladder 104 may benefit from maintenance to prevent a more complete failure. These measurements may also allow for a determination of an expected lifetime of the voltage multiplier ladder 104 (e.g., by identifying a likely amount of remaining operational lifespan based on the voltage efficiency $F_n$).

Figure 13:
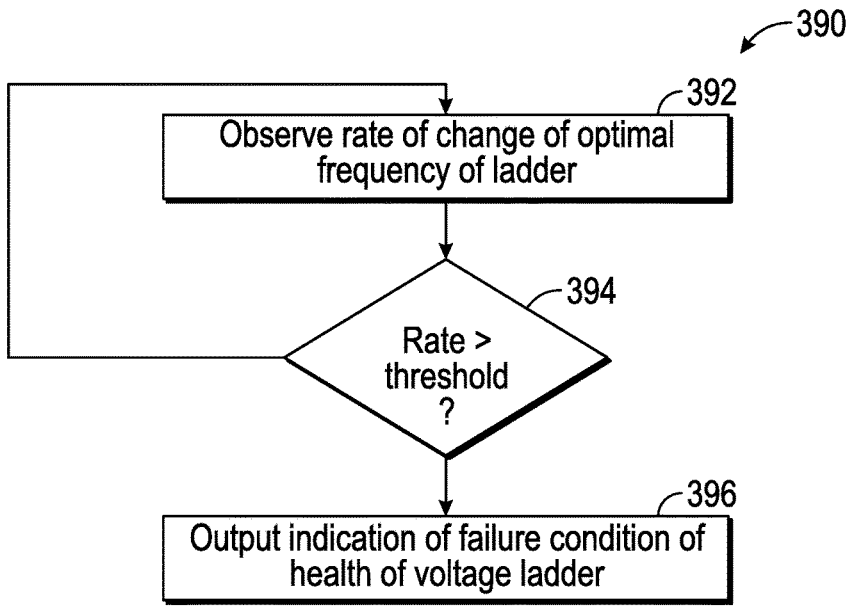
FIG. 13 is another flowchart of a method for identifying a failure condition of the voltage multiplier ladder, in accordance with an embodiment.

In another example, shown by a flowchart 390 of FIG. 13, the controller 220 may store a record of the occurrences where the controller 220 changes the input voltage frequency f during regulation of the voltage multiplier ladder 104 (e.g., as may occur during regulation based on the flowchart 350 of FIG. 11). These changes in input voltage frequency f imply changes in the optimal frequency $f_{opt}$ of the voltage multiplier ladder 104. Likewise, changes in frequency $f_{opt}$ of the voltage multiplier ladder 104 imply that the voltage multiplier ladder 104 is undergoing some kind of stress that is changing the electrical properties of its components. The controller 220 or the data processing system 24 at the surface may observe the rate of these changes (block 392). If the rate of these changes exceeds some threshold (decision block 394), this may indicate a possible impending failure condition of the voltage multiplier ladder 104. As such, the controller 220 or the data processing system 24 may provide an indication message that identifies the state of the health of the voltage multiplier ladder 104 (block 396) and/or adjust the operating parameters automatically or after operator verification to ensure that ladder can be operated at a lower stress so that a job may be finished without the complete failure of the ladder and rather with potentially less precise results. The threshold may be any suitable value based on experimental or simulated failure conditions of the voltage multiplier ladder 104 linked to the number of changes of optimal input frequency $f_{opt}$. The indication message output may indicate and, thus, may allow human operators to proactively identify, when the voltage multiplier ladder 104 may benefit from maintenance to prevent a more complete failure. These measurements may also allow for a determination of an expected lifetime of the voltage multiplier ladder 104 (e.g., by identifying a likely amount of remaining operational lifespan based on the number of changes in the optimal input frequency $f_{opt}$).

Thus, technical effects of the disclosure include, among other things, that the optimal frequency $f_{opt}$ may be maintained regardless of changes to the value of the optimal voltage efficiency $F_{opt}$. The optimal voltage efficiency $F_{opt}$ can change due to the voltage multiplier ladder capacitance, loading coil inductance, or parasitic capacitance changing under voltage and temperature stress. Maintaining optimal voltage and frequency efficiency may increase the likelihood of an optimal voltage distribution ensuring that the voltage stresses on the voltage multiplier ladder capacitors are reduced, increasing operational reliability of the voltage multiplier ladder 104.

Furthermore, measuring the voltage efficiency $F_n$ gives a system health parameter that is indicative of system problems and a method to indirectly monitor the temperature and voltage stress on components. This parameter may be used to estimate remaining operational time to failure and be used to enable a predictive, proactive maintenance scheduling system.

Although the above exemplified embodiments are described in the context of voltage efficiency F, one should readily appreciate that other variations are possible with the benefit of the current disclosure. For example, instead of or in addition to calculating a voltage efficiency F based on measurements from certain position(s) of the voltage multiplier ladder 104, one may simply use a directly measured value at such position(s) without any calculation. Examples of such measured values may include, but are not limited to, a voltage, a current, a resistance, a frequency, or a combination thereof. Such measured value may be compared to a threshold. If the measured value differs from the threshold, or otherwise deviate from a pre-determined functional relationship from the threshold, the controller 220 would adjust one or more parameters of the HV driver, so that the voltage stress in the ladder is evenly distributed and do not exceed a maximum allowable stress, and at the same time the ladder is operating at an optimal efficiency.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A system comprising:
  a voltage multiplier ladder comprising a plurality of multiplier stages N including an input stage, an output stage, and an intermediate point stage n between the input and output stage, wherein at least one loading coil is disposed along the voltage multiple ladder;
  a driver configured to provide an input voltage having an input voltage frequency and an input voltage magnitude to the voltage multiplier ladder; and
  a controller configured to regulate the driver such that a voltage stress in the ladder is evenly distributed and do not exceed a maximum allowable stress;
  wherein the controller is configured to:
  receive measurements of the voltage multiplier ladder that indicate an input stage voltage at the input stage, an intermediate stage voltage at an intermediate stage n, and an output stage voltage at the output stage;
  calculate an output voltage efficiency of the voltage multiplier ladder based on the input stage voltage and the output stage voltage;
  calculate an intermediate stage voltage efficiency of the voltage multiplier ladder based on the input stage voltage and the intermediate stage voltage;
  compare the output voltage efficiency to the intermediate stage voltage efficiency; and
  when the output voltage efficiency does not have the predetermined relationship to the intermediate stage voltage efficiency, adjust the input voltage.

2. The system of claim 1, wherein the controller is configured to:
  identify whether the intermediate stage voltage efficiency falls beneath a threshold; and
  when the intermediate stage voltage efficiency falls beneath the threshold, provide an indication of a failure condition of the voltage multiplier ladder based on the intermediate stage voltage efficiency.

3. The system of claim 1, wherein the controller is configured to:
  observe a rate of change of the input voltage frequency indicated in the control signal;
  identify whether the rate of change exceeds a threshold; and
  when the rate of change exceeds the threshold, provide an indication of a failure condition of the voltage multiplier ladder based on the rate of change.

4. The system of claim 1, wherein one or both of the input voltage frequency and the input voltage magnitude are adjusted.

5. The system of claim 1, wherein at least one electrical characteristic of the voltage multiplier ladder varies by 30% or more.

6. The system of claim 1, wherein the intermediate point stage n is at about 2/5 N stage.

7. The system of claim 1, wherein the intermediate point stage n is at the 4/5 N stage.

8. The system of claim 1, comprising an accelerator tube configured to receive the output voltage.

9. The system of claim 8, wherein the system is a downhole logging tool.

* * * * *